United States Patent

Shih

[11] Patent Number: 5,828,140
[45] Date of Patent: Oct. 27, 1998

[54] REDUNDANT POWER CONTROLLER

[76] Inventor: Steven Shih, 14, Alley 13, Lane 245, Pateh Rd., Sec 4, Teipei 105, Taiwan

[21] Appl. No.: 552,865

[22] Filed: Nov. 3, 1995

[51] Int. Cl.$^6$ ....................................................... H02J 3/14
[52] U.S. Cl. ............................... 307/18; 307/30; 307/38; 364/492; 361/160; 335/6
[58] Field of Search ................................ 307/12, 11, 38, 307/30; 364/492, 707, 273–273.5; 361/160, 170, 187; 335/20, 6

[56] References Cited

U.S. PATENT DOCUMENTS

| | | | |
|---|---|---|---|
| 4,896,254 | 1/1990 | Bennett ...................................... | 363/50 |
| 5,243,225 | 9/1993 | Schweer et al. ........................... | 307/38 |
| 5,289,043 | 2/1994 | Marshall et al. ........................... | 307/38 |
| 5,523,631 | 6/1996 | Fishman et al. ........................... | 307/38 |

*Primary Examiner*—William M. Shoop, Jr.
*Assistant Examiner*—Albert W. Paladini
*Attorney, Agent, or Firm*—Larson and Taylor

[57] ABSTRACT

A redundant power controller including two sets of switches, one of which is electrically controlled and the other is controlled manually. The electrically controlled switch is a relay-controlled switch which when detecting an abnormal input voltage, it sends out a positive voltage to cut off the power supply to the system. The mechanical switch is controlled manually to cut off the power supply to the system when needed.

5 Claims, 5 Drawing Sheets

REDUNDANT POWER CONTROLLER

FIELD OF THE PRESENT INVENTION

The present invention relates generally to a redundant power controller, in particular to a controller which incorporates with the power supply and the loads of a computer to form a control of a network which can support each other. If the controller between the power source and the loads of the computer uses a relay as the control media, it protects the network by automatically disconnecting the power when a malfunction happens to one of the loads. In other words, if the controller between the power source and the loads of the computer uses a mechanically-made switch as the controller, the power can be turned off by an external force due to a variety of needs of the network. For example, processing the troubleshooting of a device of the network, replacement of some element of a certain device and removing a power source or a load of the computer. Despite some part of the circuit having been disconnected either by a controller of a relay or by a controller of a mechanically-made switch, the computer network will not be affected and maintains a stable working condition.

BACKGROUND OF THE INVENTION

Nowadays, no matter what is in the computer system, work station, file server or any other device using a power supply of a computer system, the computer systems contains only one power supply which supplies all the electricity needed in the network by a variety of devices such as: mother board, HDD, CD-ROM etc. Conventionally, if one device in the system is malfunctioned, it is necessary to turn off the power first then to proceed with the maintenance procedure of the device Also if the system user is trying to add another accessary to the system, it also is required for the sake of safety to turn off the power first then to proceed with the installation of the accessary. If the power supply provides all the devices and/or accessaries in the system with electricity, the power-down situation will also affect and even stop the processing of the whole system. The waiting period for troubleshooting the malfunction or the time needed for the installation of a device/accessary to the system is so long that the people or company that uses the computer very often considers it a great loss. For the above reason, it is advisable to provide a redundant power controller installed between the power supply and the computer system as the controlling media to control the power a between plurality of mother boards and accessaries. The controller can either be composed of electrical elements or of mechanical elements. When a malfunction occurs to one mother board or one of the accessaries or one of the device is removed for other use, the controller will detect the variation of the system and will cut off the power between the mother board and one of the accessaries without affecting the normal processing of other system.

SUMMARY OF THE INVENTION

It is therefor an object of the present invention to rovide a redundant power controller which can detect the ariation of the system and automatically cut off the power etween the mother board and one of the accessaries, which will not only protect the system from overload due to a malfunction, but also can maintain the whole system in a situation of a normal working condition.

It is another object of the present invention to provide a redundant power controller which can save a great deal of time for the people who use the computer very often, because the power in the system will not be cut off even should a malfunction occur in one of the accessaries.

The present invention as disclosed by the accompanying drawings and description is not to be limited in the scope or spirit of the invention. They are merely described as preferred embodiments of the present invention.

BRIEF DESCRIPTION OF THE DRAWINGS

Reference is now made to the accompanying drawings, in which is shown an illustrative embodiment of the present invention from which its novel features and advantages will be apparent, wherein.

DETAILED DESCRIPTION OF THE PREFERRED EMBODIMENT

Figure 1:
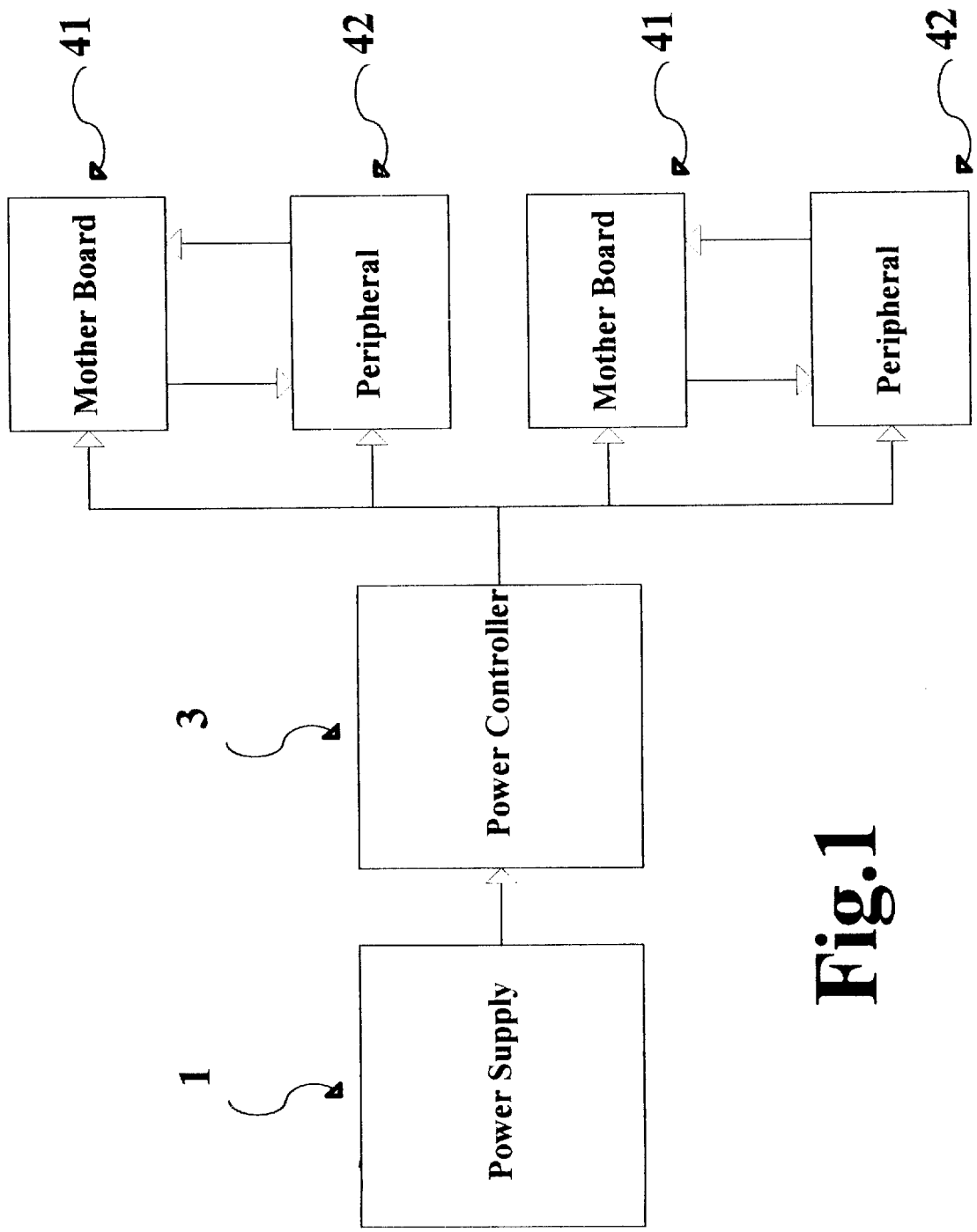
FIG. 1 is a functional block diagram of the present invention.
Figure 1A:
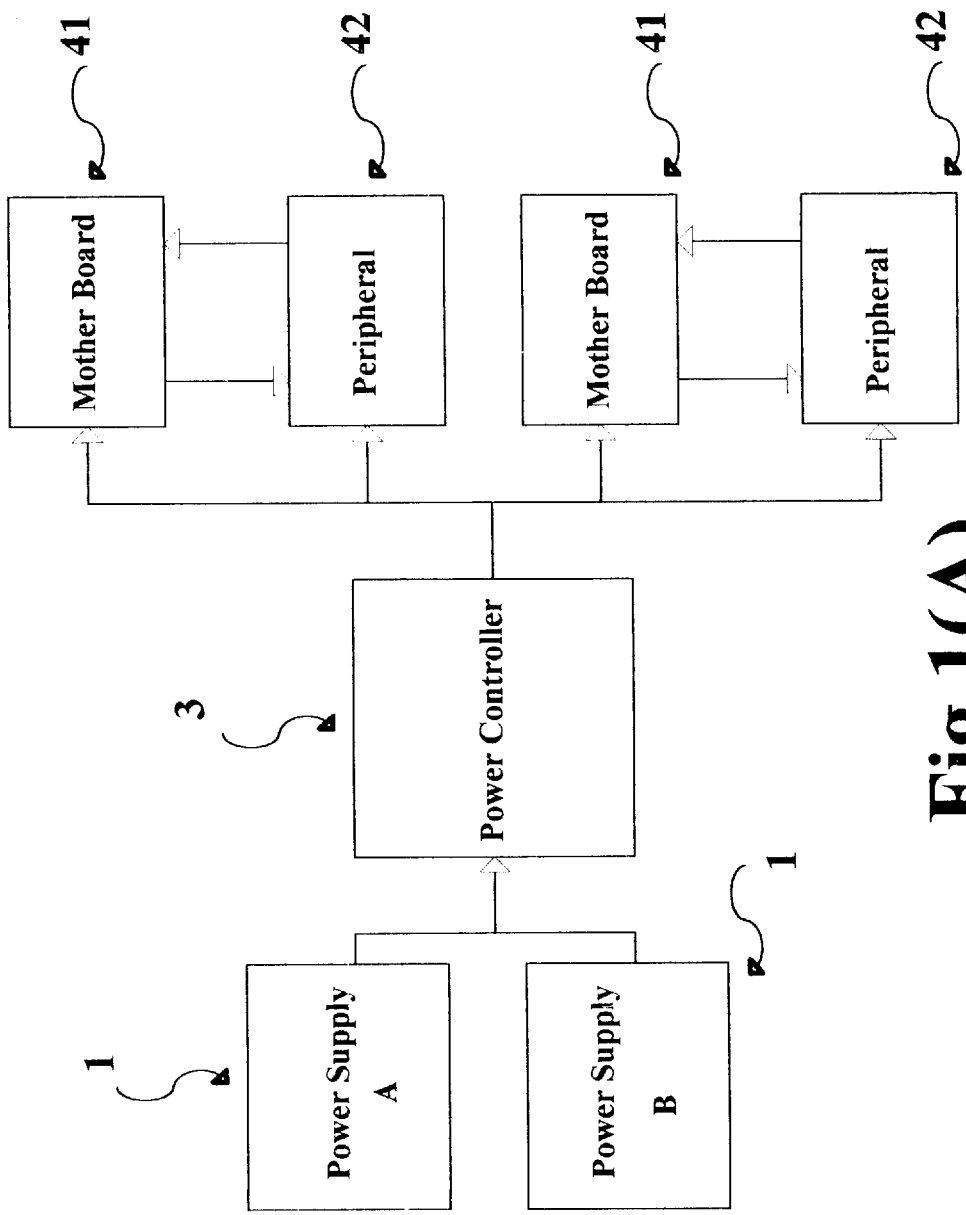
FIG. 1A through FIG. 1C are other functional block diagrams of the preferred embodiments of the present invention.

With reference to the drawings, and in particular to FIG. 1, wherein a functional block diagram of a redundant power controller constructed in accordance with the present invention is shown, the controller 3 is connected to the output of a power supply 1, and between accessaries such as a mother board 41, CD-ROM and pheripherals 42 such as a for cutting off the power to individual devices connecting with the computer. Also, as shown in FIG. 1(A) a redundant power controller 2 can be added between the controller 3 and the first power supply 1. The redundant power supply 1 connects at least one power supply 4 for stabilizing the output current and to output the current of the power supply 1.

For a better understanding of the function and structure of the present invention, the preferred embodiments of the invention are shown in FIG. 1 and FIG. 1A to FIG. 1C. Referring to FIG. 1, when a single power supply 1 and a controller 3 form the computer system for supporting only one system, the controller 3 controls only the power of the accessaries. If the accessaries include HDD, SDD, CD-ROM... etc, and one of the devices, for example, SDD, has a malfunction, the controller 3 will immediately cut off the power to that specific accessary, thereby providing a safe environment for the user to proceed with the maintenance without affecting the power supply of other devices. The controller 3 comprises switches such as a relay and/or a mechanical switch.

Referring to FIG. 1A, when a plural power supply 1 and a single controller 3 form the computer power system for supporting only one system, and if one device in the system has a malfunction, the controller 3 will immediately cut off the power to that specific device without affecting the power supply of other devices.

Figure 1B:
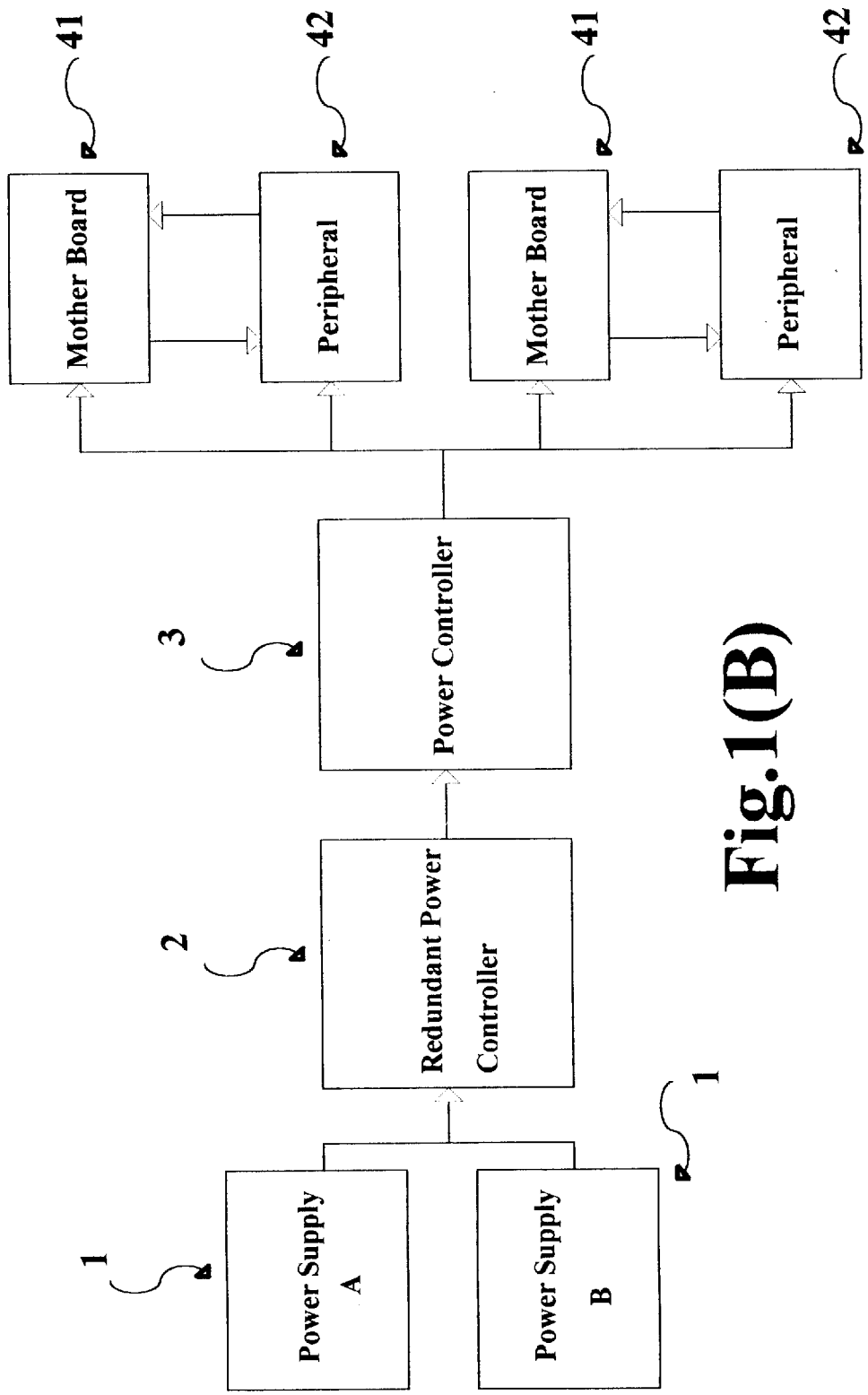

Referring to FIG. 1B, when the computer system comprises plural power supplies 1, one redundant power controller 2, and one controller 3 for supporting only one system 2, and if one device in the system has malfunction, the controller 3 will immediately cut off the power to that specific device without affecting the power supply of other devices. Furthermore, the redundant power controller 2 outputs the current of the plural power supplies 1 in parallel with the same voltage but greater current, which will upgrade the efficiency of the system and minimize the load of the power supply 1. The redundant power controller 2 has an element such as a diode for converting the output voltage of the power supply into a stabilized output voltage to controller 3 for supplying the system.

Figure 1C:
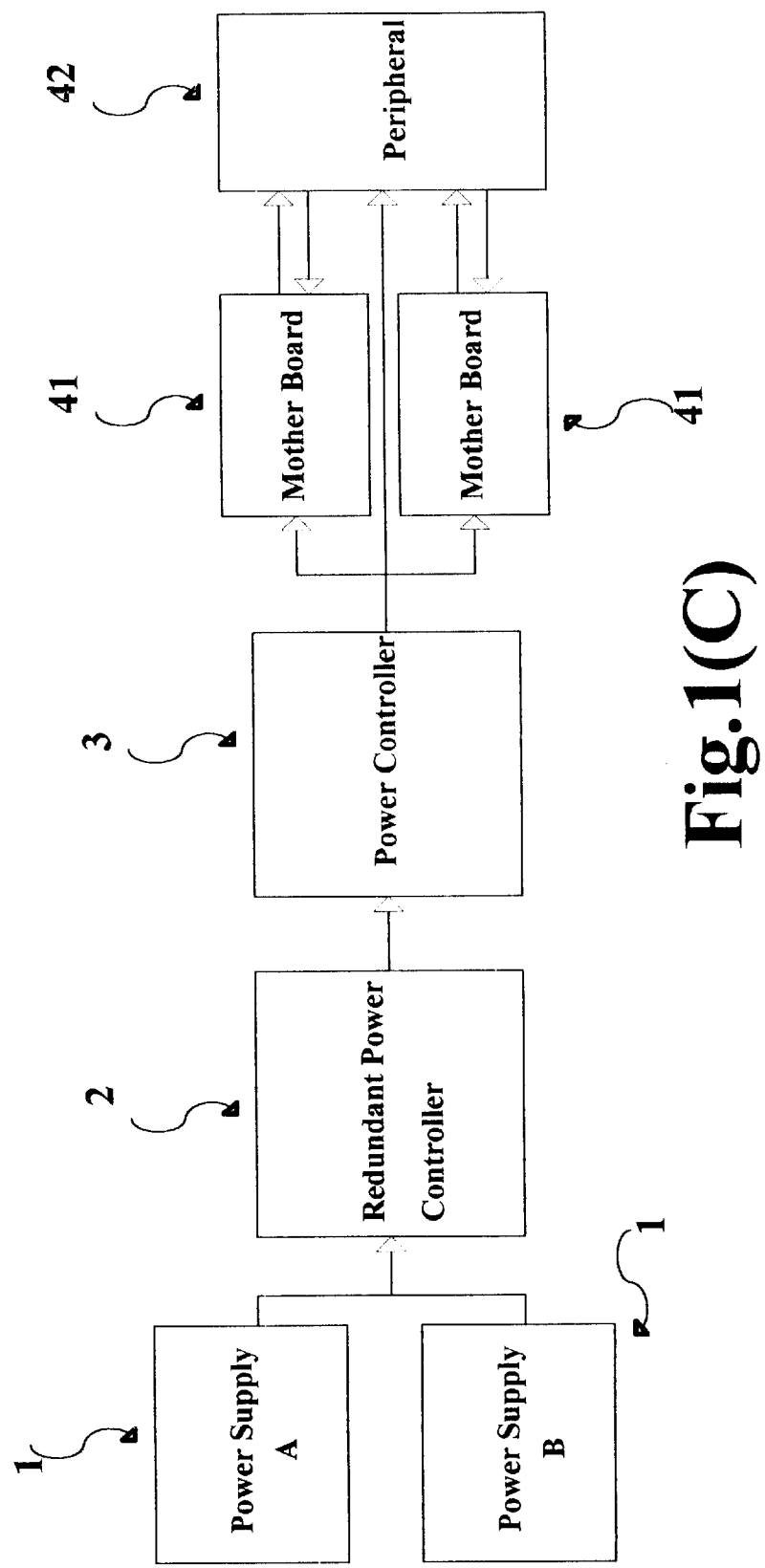

Referring to FIG. 1C, when the computer system comprises plural power supplies 1, one redundant power controller 2, and one controller 3 for supporting a number of systems such as mother boards 41, and if one of the mother boards 41 has malfunction, the controller 3 will immediately cut off the power to the out-of-order mother board 41 for the user to proceed the maintenance procedure without affecting the power supply of other devices. Under this circumstance, a power supply 1 provides power to the other mother board 41, yet, the controller 3 and the redundant power controller 3 control the output voltage of the power supplies 1, which means that if one device in the system 2 has malfunction, the controller 3 will cut off the corresponding power supply to that specific device, without affecting the normal process of the devices in the same system 2 and other systems as well.

As described above, the switches in the controller 3 operate the control in both ways. One is to detect the variations of certain device(s) in the system and automatically cut off the power supply to that specific device via an electric switch such as a relay. The other is to turn off the power supply manually according to the various situations of the power supplies 1 or the system mother boards 41 and to proceed with the work or whatever is needed by the user without affecting the power supply to other devices and/or mother boards 41. This completely changes and improves the method of power supply of the current computer system and provides a more convenient working environment for computer users.

Figure 2:
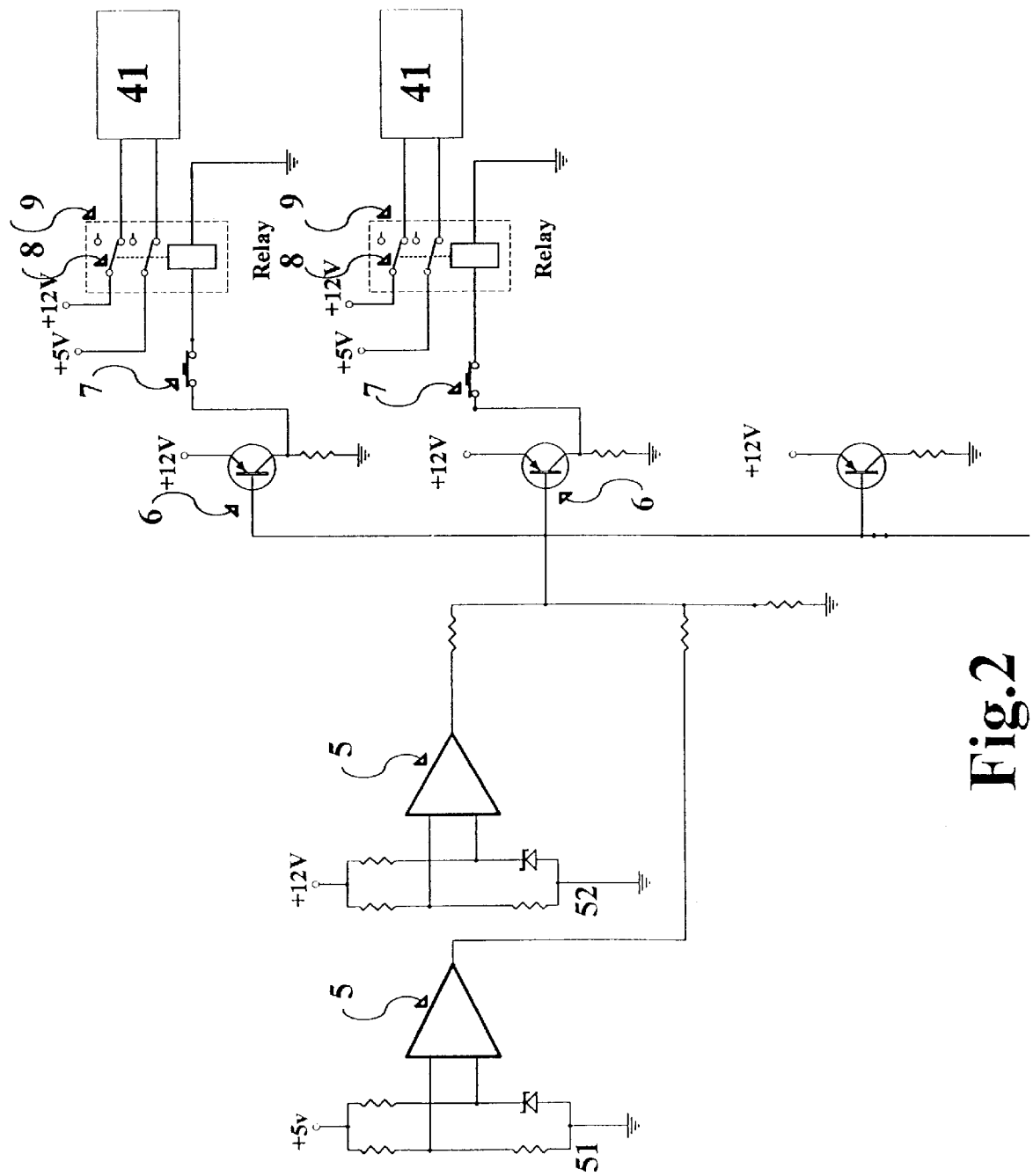
FIG. 2 is a detailed circuit of the present invention.

Referring to FIG. 2, a detailed circuit diagram constructed in accordance with the present invention is depicted. The redundant power controller 3 is comprised of two comparators 5, one electric switch 6, one mechanical switch 7, one set of switches 8 and one relay 9, which functions automatically or manually cutting off the power supply. A comparator 5 is comprised of an OP Amp (Operation Amplifier) in the present invention and its functions is to detect the output voltage of the power supply 1 or the redundant power controller 2. The output voltage (5V) of the power supply 1, which is the division of a resistor R1, connects to the positive input terminal of the comparator 5 and connects a ziner diode 51 breakdown voltage (5.6 V) in parallel via a resistor R2 to the negative input terminal of the comparator 5, and the output terminal of.the comparator 5 then connects.to the input terminal of the electric switch 6. The only difference of the other comparator 5' is that the input voltage of the power supply 4 is 12 V and the ziner diode 52 in parallel has a breakdown voltage of 13.6 V. The main purpose of these two comparators 5' are to detect whether the input voltage of the power supply 4 is in the range of 5-12V. If the input voltage of the power supply 4 is greater than 5.6V or 13.6V, the corresponding comparator outputs a positive voltage to turn on the electric switch 6. The mechanical switch 7 connects between the output terminal of the electric switch 6 and the control terminal of the relay 9, and each switch of the switch set 8 connects to the mother board and the accessaries respectively (not shown and labeled in the Figure). Normally, the mechanical switch 7 remains on when the power supply is normal. If the input voltage of the power supply 1 is greater than 5V or 12V, the electric switch 6 will be turned on making the relay 9 to switch to another mode, which also makes the switch set 8 to cut off the power supply to the system. When the input voltage of the power supply 1 is normal, the electric switch 6 again is off, which will provide the power to the system 2. When a malfunction. happens to one of the system mother boards of accessaries, the computer user can disconnect the power supply by turning off the mechanical switch 7 without affecting the proper process of other systems. When one device in a system has component a malfunction, the user can also proceed with the maintenance procedure without affecting the process of other devices by turning off the corresponding switch in the switch set 8.

Although preferred embodiments have been described to illustrate the present invention, it is apparent that changes and modifications in the specifically described embodiments can be carried out without departing from the scope of the invention which is intended to be limited only by the appended claims.

What we claim is:

1. A redundant power controller used in a computer system that has a plurality of components including a Power supply and a plurality of accessaries and that is connected between the output of the power supply and an input to each of the plurality of accessaries for cutting off the power to an individual accessary without affecting the power supply to other system components, said power controller comprising:

a comparator circuit for detecting the input of the voltage of the power supply and for outputting a signal when the voltage is not within a predetermined range;

a relay switch individual to each accessary and comprised. of a normally closed mechanical switch connected between the power supply and the corresponding accessary and a relay that can oven said mechanical switch;

an electric switch individual to each accessary that is operated in response to said signal and which is connected between a relay power source and said relay; and a mechanically operable switch that is normally closed and is connected in series between said electric switch and said relay;

whereby the accessaries can be individually deenergized by operating said mechanically operable switch and said electric switch can automatically deenergize said accessaries upon the generation of said signal.

2. A redundant power controller as claimed in claim 1 wherein said comparator circuit includes a comparitor having two inputs, a ziner diode connected to one of said comparator inputs and a voltage divider circuit connected between said power supply and the other input of said comparator.

3. A redundant power controller as claimed in claim 2 wherein the power supply has a first output and a second output for supplying two different voltages; and wherein said comparator circuit includes a further comparator having two inputs, a ziner diode connected between one of said inputs of said further comparator circuit and one of said power supply outputs, and a voltage divider circuit connected between said one of said power supply outputs and the other input of said further comparator, said voltage divider circuit of said first mentioned comparator being connected to the other of sail power supply outputs.

4. A redundant power controller for a computer system connected between a power supply and a plurality of loads, the power controller comprising:

a plurality of mechanical switches which are normally closed, each of which is connected to one of the loads such that the corresponding load can be deenergized by opening said switch without affecting the power being supplied to the other loads; and means for detecting the voltage of said power supply and for deenergizing all of the loads upon detecting a predetermined voltage, said voltage detecting means being in series with said mechanical switches.

5. A redundant power controller as claimed in claim 4 wherein said each of said mechanical switches is an on/off switch.

* * * * *